United States Patent [19]
Kimbel et al.

[11] Patent Number: 5,957,765
[45] Date of Patent: Sep. 28, 1999

[54] HAND-HELD MACHINE TOOL

[76] Inventors: Erich Kimbel; Gerd Buchter; Jill Taylor, all of Werder Str. 9 (Proforma Design), 65195 Wiesbaden, Germany

[*] Notice: This patent is subject to a terminal disclaimer.

[21] Appl. No.: 08/953,927

[22] Filed: Oct. 20, 1997

Related U.S. Application Data

[63] Continuation-in-part of application No. 08/491,413, Jun. 16, 1995.

[30] Foreign Application Priority Data

Apr. 18, 1997 [DE] Germany .......................... 297 07 040

[51] Int. Cl.$^6$ .................................................. B24B 23/00
[52] U.S. Cl. .......................................... 451/358; 451/356
[58] Field of Search ...................................... 451/356, 358

[56] References Cited

U.S. PATENT DOCUMENTS

| | | |
|---|---|---|
| 3,120,845 | 2/1964 | Homer . |
| 3,720,269 | 3/1973 | Wanner et al. . |
| 3,841,416 | 10/1974 | Pfister ........................................ 173/47 |
| 4,090,297 | 5/1978 | Wanner et al. ........................ 451/356 |
| 5,678,292 | 10/1997 | Kimbel et al. ........................... 29/76.4 |

FOREIGN PATENT DOCUMENTS

| | | |
|---|---|---|
| 9315498 | 5/1994 | Germany . |
| 29508308 U | 8/1995 | Germany . |

*Primary Examiner*—David A. Scherbel
*Assistant Examiner*—Shantese McDonald
*Attorney, Agent, or Firm*—Reising, Ethington, Barnes, Kisselle, Learman & McCulloch, P.C.

[57] ABSTRACT

A portable power tool comprises a housing, a motor with a driving mechanism for a cylindrical tool for sanding, rasping of filing a workpiece, and means for guiding and supporting the power tool on the workpiece surface. The driving mechanism includes means for rotating and oscillating the output shaft and the tool. The oscillating means includes a wobbling swash plate which is fixed to an intermediate shaft at a slant angle thereto, and follower means engaging the wobbling swash plate. When the intermediate shaft and the swash plate rotate, the follower means reciprocates to oscillate the tool along the output shaft axis.

33 Claims, 10 Drawing Sheets

HAND-HELD MACHINE TOOL

This application is a continuation-in-part SLM of application Ser. No. 08/491,413, filed Jun. 16, 1995.

FIELD OF THE INVENTION

The invention relates to machines for the do-it-yourselfer and particularly to a hand-held machine tool for working on edges or surfaces of workpieces such as sanding, rasping or filing a workpiece.

BACKGROUND AND OBJECTS

There are many tools for do-it-yourself work, yet a hand-held machine tool for sanding, rasping or filing adapted for the needs of the do-it-yourselfer seems not to be on the market.

It is therefore an object of the present invention to provide a machine tool for sanding, rasping or filing which is small in size and can be hold by hand.

It is another object of the present invention to provide a machine tool for sanding, rasping or filing which is simple in construction.

A further object of the present invention is to provide a machine tool for sanding, rasping or filing which can be produced economically.

A further object of the invention is to provide a machine tool for sanding, rasping or filing which can be applied for many purposes and is versatile.

A still further object is to provide a machine tool which is adapted for working onto interior surfaces and edges.

SUMMARY OF THE INVENTION

In a preferred embodiment of the invention, the hand-held machine tool has an all-over design similar to a jig saw, that is, a casing has two hollows which enclose an electric motor and a drive mechanism, respectively. The electric motor defines an axis, and parallel thereto a base plate as a guiding and supporting means is provided which can be angled in both directions up to 45° from its neutral position in which the tool extends perpendicularly to the plane of the base plate. The driving mechanism is designed for producing a rotating and oscillating movement to a shaft which is used as the tool holder.

In another embodiment of the invention, the hand-held machine tool takes an outer shape similar to an electric drill, yet including a base plate as a guiding and supporting means at the exit end of the driven shaft which may be rotated and oscillated.

In a still further, simplified embodiment of the invention, the drive mechanism is provided only for rotating the tool.

All embodiments of the invention may be provided with vacuum ducts to allow the dust to be sucked away.

The electric motor of the machine tool may be energized through a cable, yet it is also possible to provide accus for energization.

BRIEF DESCRIPTION OF THE DRAWINGS

The invention, together with additional objects, features and advantages thereof, will be best understood from the following description, the appended claims and the accompanying drawings, in which

DETAILED DESCRIPTION

Figure 1:
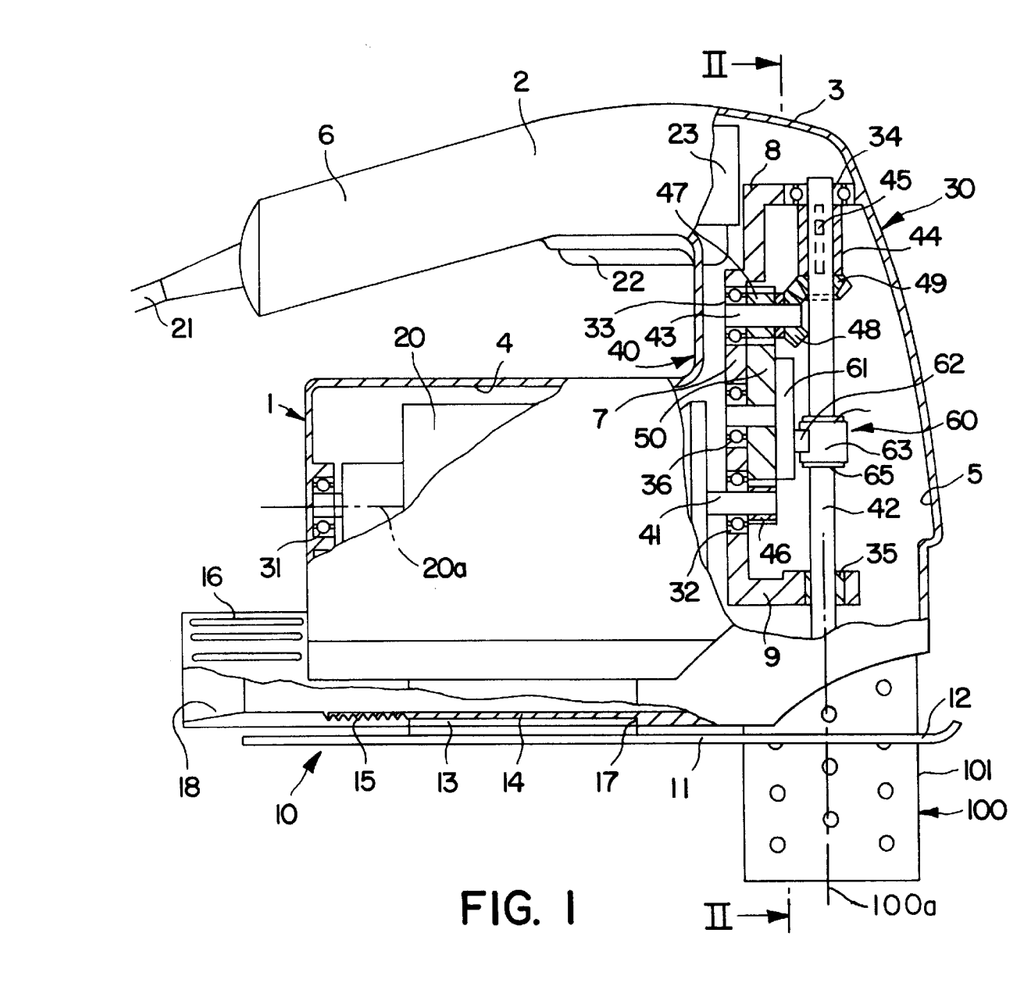
FIG. 1 is a schematic side view, partly in cross-section, of a first embodiment of the machine tool of invention.
Figure 2:
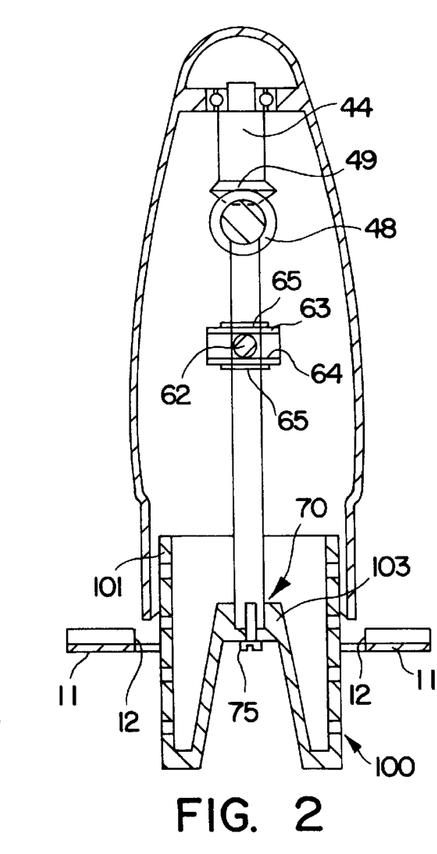
FIG. 2 is a section along the lines II—II in FIG. 1.

Referring to FIGS. 1 and 2, the first embodiment of the hand-held machine tool is shown having a casing 1 which has general outlines of a jig saw. The casing 1 is comprised of essentially two shell halves 2 and 3 which mate and are held together by bolts (not shown). The casing 1 includes two main hollows 4 and 5. The hollow is provided for accomodating an electric motor 20 and defines a motor axis 20a. The other hollow 5 is for accomodating a driving mechanism 30 and defines a tool axis 100a which is perpendicular to the motor axis 20a. The driving mechanism is for rotating and oscillating a tool 100 which has an outer cylindrical surface 101 and may be adapted for sanding, rasping or filing a workpiece. At the lower side of the casing 1 and motor 20, a guiding and supporting means 10 extends parallely to the motor axis 20a and includes a base plate or skid plate 11 having a recess 12 through which the tool 100 extends. The plate 11 is fixed to a sleeve 13 having at least a part circular cross section. The sleeve 13 is pivotably mounted in a part circular recess (not shown) of the casing 1, i.e. the shell halves 2, 3 encircle the periphery of the sleeve 13 to about 200° to 300° center angle and hold it so as to form a pivot joint. A tube 14 extends through the sleeve 13 so that the inner end thereof is adjacent the tool 100, and the outer end thereof projects from the casing 1 and is formed as a knob 16. The tube 14 and the casing 1 have threads 15 which interengage so that the tube 14 can be shifted somewhat parallel to the motor axis 20a. The tube 14 has a collar 17 engaging the sleeve 13. The plate 11 may be pivoted about the axis of the sleeve 13 up to 45° from the horizontal, neutral position, and then fixed in the adjusted position by tightening the knob 16 so as to press the collar 17 against the sleeve 13 and clamp the sleeve 13 in position.

The machine tool may be connected to a vacuum system (not shown) and for that purpose the interior 18 of the tube 14 is prepared to be connected to a further duct (not shown). The opening of the tube 14 arranged near the upper end of the tool 100 functions as the suction opening.

In the preferred embodiments, the casing 1 is also formed with a handle 6. As shown, an electric cable 21 passes through the walls of the handle 6 into the interior thereof where connections are made to a switch 22 and to the motor 20 so as to energize or deenergize same. In the interior of the handle 6, also some safety equipment 23 can be housed.

The electric motor 20 comprises a shaft 41 which is journalled in bearings 31 and 32 and is the driving or input shaft for the driving mechanism 30. This mechanism 30 includes a gear transmission 40 and an oscillating mechanism 60. The gear transmission 40 comprises a driven or output shaft 42 and two intermediate shafts 43, 44. For journalling these shafts, the second hollow 5 is encircled by partition walls 7, 8, 9, each having openings for accomodating bearings 32, 33, 34, 35 and 36. The partition walls 8 and 9 are arranged perpendicularly to the partition wall 7 at the ends thereof. The gear transmission 40 also comprises meshing gears 46, 47 and 50 to transmit power from shaft 41 to shaft 43 and meshing bevel gears 48, 49 to transmit power between shafts 43, 44. The intermediate shaft 44 is a hollow shaft, and the shaft 42 extends therethrough. Coupling means 45 are provided on the inner surface of the hollow shaft 44 and the outer surface of the shaft 42 so that shaft 42 can move axially, yet is driven in rotational direction when the hollow shaft 44 rotates. Such a coupling 45 can be provided by splines on shafts 42, 45, yet also a dog-groove combination as indicated in the drawings will be sufficient for that purpose.

The oscillating mechanism 60 is for reciprocating the output shaft 42. The intermediate gear 50 carries a disk 61 having a crank pin 62. A two-piece follower member 63 having a groove 64 therein is rotatably fixed to the shaft 42, that is, shaft 42 has spring rings 65 which form shoulders for axially supporting the follower member 63, yet allowing rotational movement thereof. The groove 64 of the follower member 63 allows the crank pin 62 to slide therein. When shaft 41 rotates, the disk 61 also rotates, and the crank pin 62 orbits taking along the follower member 63 which shifts the shaft 42 up and down.

Gears 46, 50 have a diameter ratio of 1 to 7 or 1 to 10, that is, seven (ten) revolutions of shaft 41 correspond to one revolution of gear 50. Gear 47 has a similar diameter than gear 46, and this is also true for bevel gears 48, 49. Therefore, shaft 42 will make seven (ten) revolutions in one reciprocating movement. This is important for the comfortable handling of the machine tool.

Whereas the motor 20 can be of various types and wattages, a type of 1500 to 2000 rev/min and of 500 or 550 watts has proven to correspond to the needs.

Figure 7:
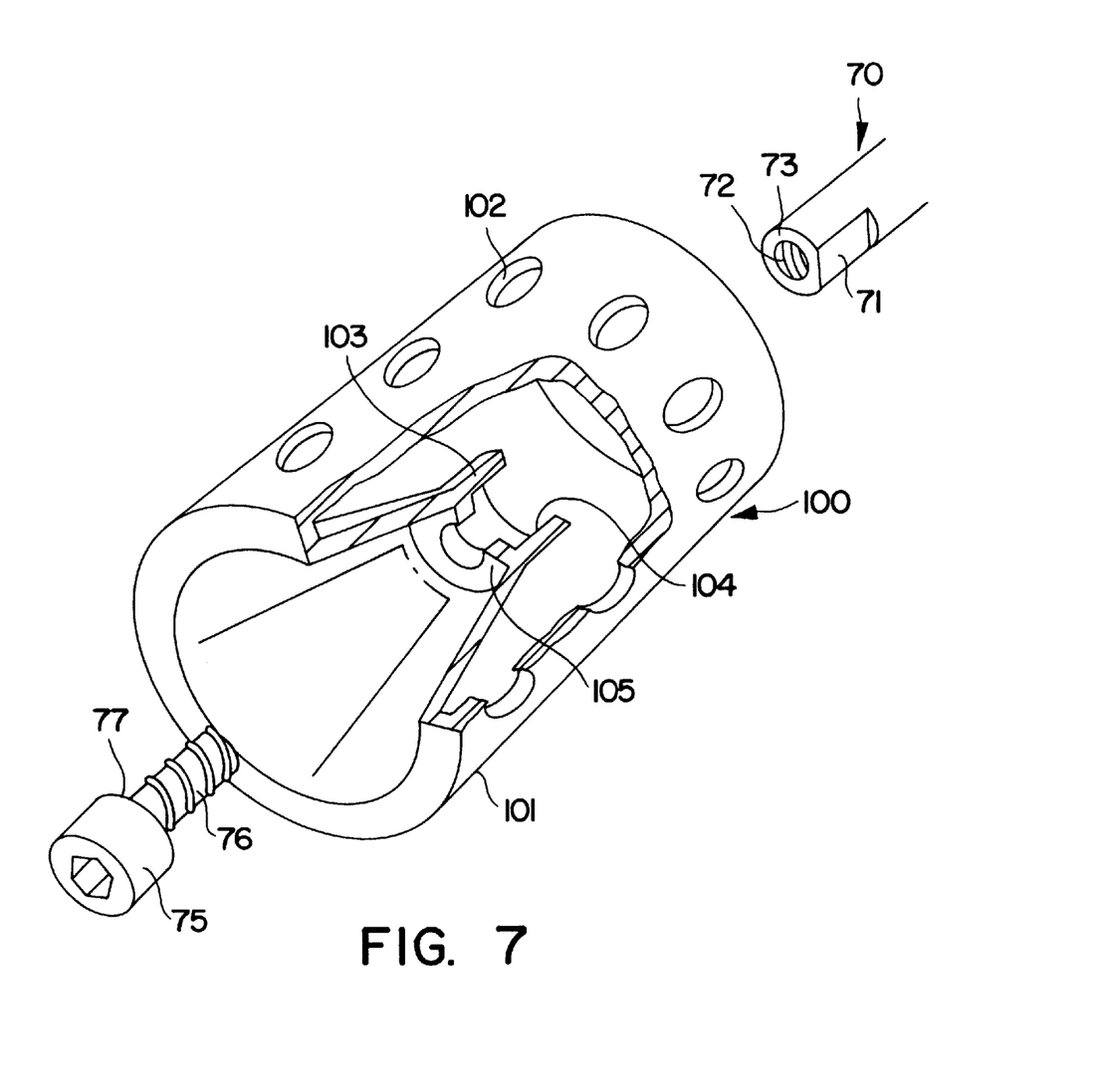
FIG. 7 is an exploded view of a tool holder and tool, partly brocken away.

Shaft 42 has an end formed as a tool holder 70 (see FIGS. 2 and 7). The tool 100 has a generally cylindrical outer surface 101 which is adapted for sanding, rasping or filing operations and may have a plurality of radial holes 102. The tool has a central hub 103 with a noncircular hole 104 in it for being connected to the tool holder 70 which has a flat 71. The tool holder 70 also has a threaded hole 72 for being engaged by a hexagon socket head cap screw 75 so as to hold the tool 100 on the toolholder 70. The hub 103 also has a collar 105 providing a passage for the screw shaft 76 and offering shoulders for the end face 73 of the tool holder 70 and the annular surface 77 of the screw head 75.

As an alternative to the embodiment shown, the base plate 11 of the guiding and supporting means 10 may be pivotionally mounted to the lower side of the casing 1 in a similar manner as is known from jig saws. The base or skid plate 11 defines a guiding axis along its central line (and parallel to the motor axis 20a), and concentric to this guiding axis, guiding means are provided at the lower side of casing 1 which are engaged by appropriate members connected to the plate 11 so that the plate 11 can be pivoted about its central line. A screw bolt admits to fix the pivotional position of the plate 11.

Figure 3:
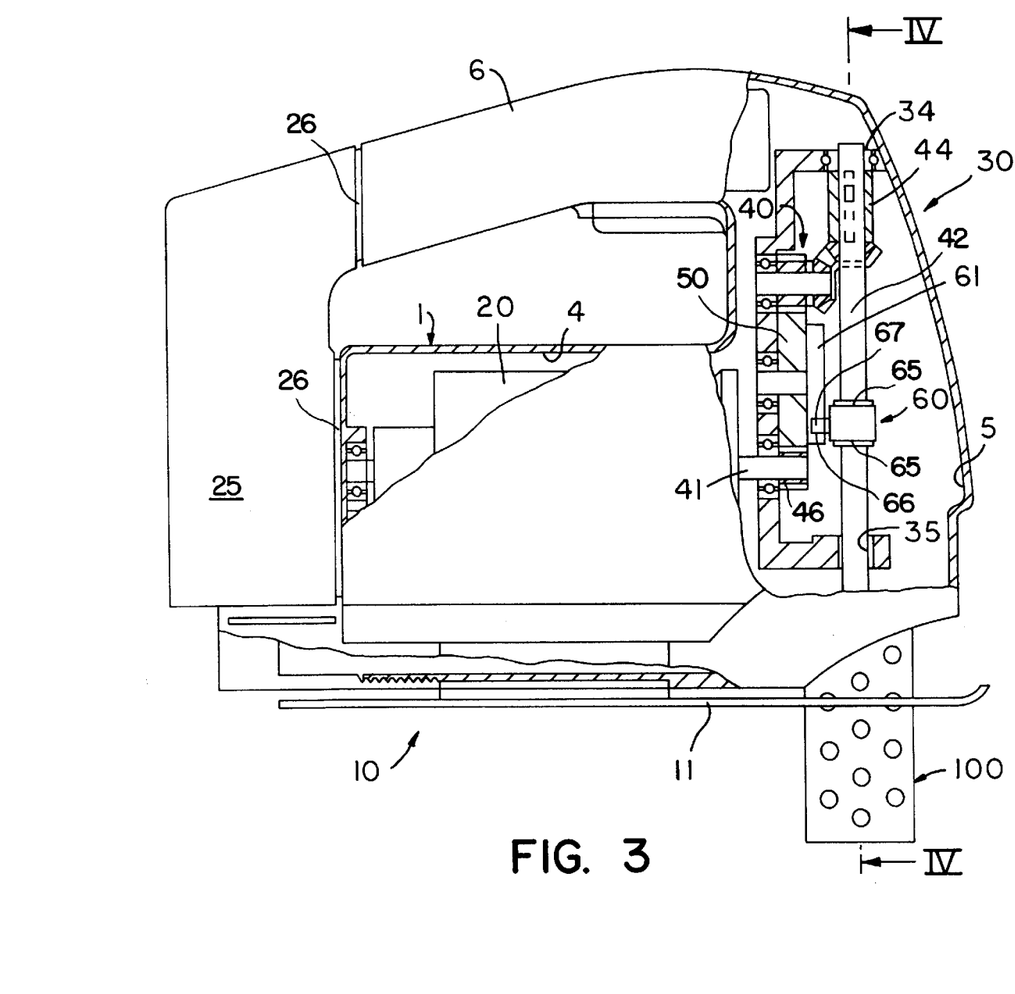
FIG. 3 is a schematic side view of a second embodiment of the machine tool of invention, partly in cross-section.
Figure 4:
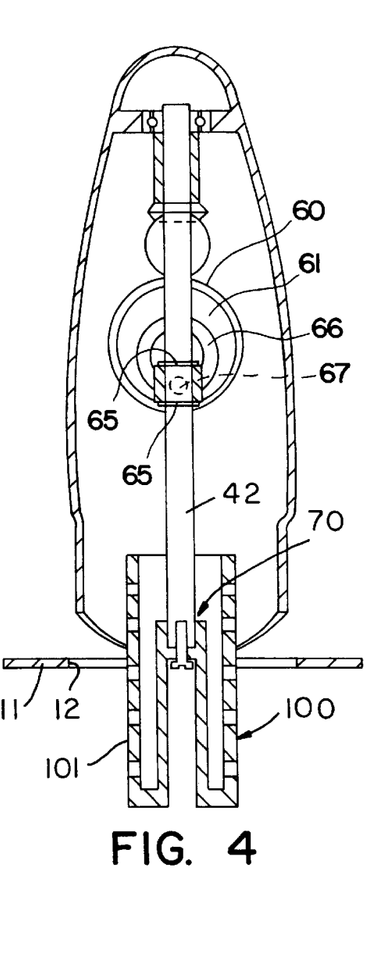
FIG. 4 is a sectional view along the lines IV—IV in FIG. 3.

FIGS. 3 and 4 show a second embodiment of the machine tool according to invention. Similar parts show the same reference numbers as in the first embodiment and need not be described further. Instead of being energized by cable, the second embodiment has an accumulator 25 which is coupled to the casing 1 and can be removed for being charged. Male and female connectors 26 are provided within the respective ends of the accumulator 25 and the casing 1 and handle 6 so as to bring the electric energy to the conductors concealed in the handle 6 and leading to the switch 22 and the motor 20.

FIGS. 3 and 4 also show a modification of the means 60 for oscillating output shaft 42. The disk 61 is provided with an excentric groove 66 and the follower member 63 has a pin or peg 67 which engages that groove 66. The follower 63 is rotatably fixed to the output shaft 42 as by spring rings 65 so as to allow a rotational movement of the follower 63 relative to the output shaft 42.

The operation is the same as with the preceding embodiment which also could be used instead of the shown modification of the oscillating device. When the disk 61 rotates, the pin 67 can follow the up-and-down movement of the excentric groove 66 so that the follower 63 oscillates, and the shaft 42 is carried along in this reciprocating movement.

The tool 100 is shown with a smaller diameter of the outer cylindrical surface 101 which is an option for the several tools that can be attached to the machine.

Figure 5:
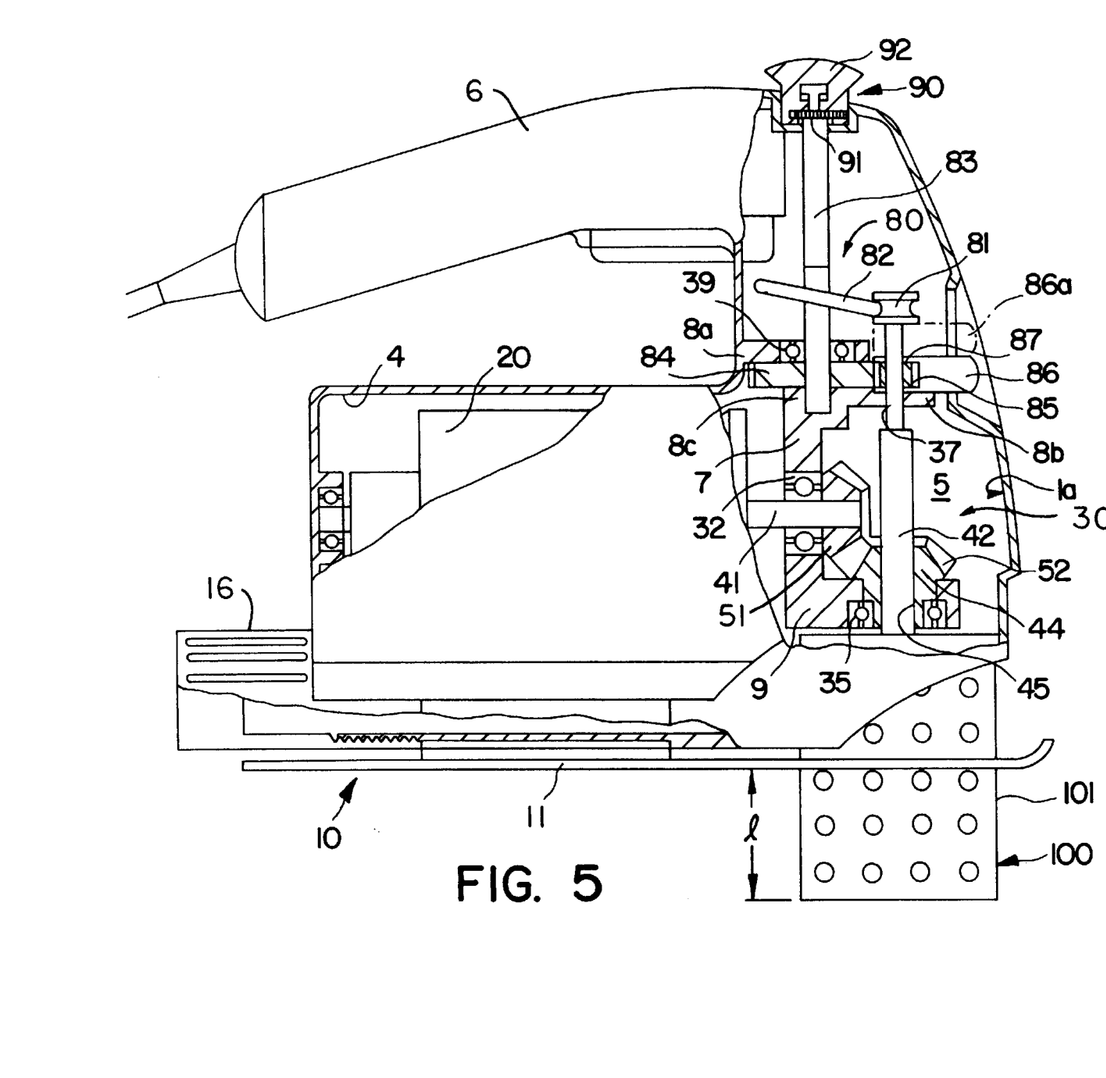
FIG. 5 is a side view, with parts broken away, of a third embodiment of the machine tool of invention.

FIG. 5 shows a third embodiment of the machine tool. Similar parts to the preceding embodiments have corresponding reference numbers and need not be described in detail.

The input shaft 41 drives a bevel gear 51 which is in meshing engagement with a bevel gear 52 fixedly connected to an intermediate hollow shaft 44 which at its inner surface has coupling means 45 meshing with corresponding coupling means of the output shaft 42. The up and down movement of shaft 42 is produced by a switchable oscillating means 80. The upper end of output shaft 42 is connected to a cam follower 81 in the form of a grooved roller. The switchable oscillating means 80 has a swash plate 82 for providing upward and downward movement of the cam follower 81 and the shaft 42.

The swash plate 82 is fixed to a shaft 83 which is held against axial movement and journalled in a bearing 39 and rotated by a gear 84 which is driven by a switchable gear 85 which is in engagement with the coupling means 45 of the output shaft 42. In practice, the shaft 42 may be splined at its upper and lower ends, or throughout its entire length.

When the motor 20 is energized, input shaft 41 via bevel gears 51, 52, intermediate shaft 44 and splines 45 drive output shaft 42 which is reciprocated by the action of the cam follower 81 and the swash plate 82. Please note that the diameter ratio of gears 85/84 which is in the range of 1:5 and 1:12 and preferably between 1:7 and 1:10, determines the number of revolutions of the output shaft in one up- and down-movement.

Figure 5A:
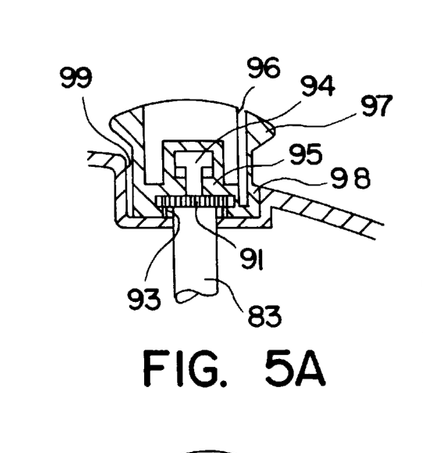
FIGS. 5a, 5b show a knob of the third embodiment in an enlarged cross-section and a plan view, respectively.
Figure 5B:
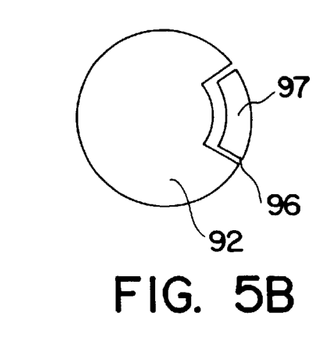

Gear 85 is made switchable by a latchable slider 86 which has fork means 87 engaging the upper and lower sides of the gear 85, respectively. When the slider 86 is shifted to an upper position 86a shown in phantom, and where it is latched, the gears 85, 84 get out of meshing contact and the oscillating movement is shut down, i.e. the tool 100 simply rotates without reciprocating. For that mode of use (simply rotating) an adjusting device 90 for adjusting the position of the tool 100 relative to the plane of the skid plate 11 is provided. The shaft 83 has a disk 91 at its upper end which is positioned outside the hollow 5 of casing 1, and is encompassed by a knob 92 which loosely fits over disk 91 without being turned by the disk 91 when the shaft 83 rotates. The disk 91 has serrations or teeth at its outer periphery which can be engaged by corresponding teeth 93 of the knob 92 when the same is lifted somewhat so as to couple the knob 92 to the disk 91 and therefore also to the shaft 83. Lifting the knob 92 is limited by a shaft extension 94 fixed at the upper end of shaft 83 and forming an undercut portion of that shaft in which a collar 95 of the knob 92 extends. The knob 92 also has a slot 96 (see FIGS. 5a, 5b) so as to form a lever portion 97 which carries a cog or projection 98. The casing 1 forms a circular recess 99 in which the lower end of the knob 92 extends, and the cog 98 engages with bias the annular wall of the recess 99 so that the knob normally is fixed relative to the casing 1. If the lever portion 97 is pressed inwardly of the knob 92, cog 98 is disengaged from the annular wall of recess 99, and the knob 92 may be turned.

In case of the oscillating mode is shut down (slider 86 in position 86a) turning of knob 92 coupled to shaft 83 will lead to turning of swash plate 82 which shifts the output shaft 42 upwardly, or downwardly, depending upon the direction of turning the knob 92. This will shift the tool 100 upwardly, or downwardly, as the case is. In this manner, the working length 1 of the tool 100 in the mode of simply rotating can be adjusted within the stroke length of the swash plate 82.

The FIG. 5 embodiment can be modified in that bevel gear 52 is meshing with a further bevel gear (not shown) which is to be journalled as at place 1a of the casing and carries a crank pin 62 or an excentric groove 66 which are part of an oscillating mechanism 60 as explained with the FIG. 1 to 4 embodiments. The transmission ratio of the oscillating movement to the rotational movement is again given by the diameter ratio of the meshing gears. In this modified embodiment, the switchable oscillating means 80 and the adjusting device 90 have been omitted.

In a simplified version of the FIG. 5 embodiment, the output shaft 42 may be fixedly connected to the bevel gear 52, and members 80 through 99 are again omitted. This simplified version allows rotational movement of the tool without oscillating.

Figure 6:
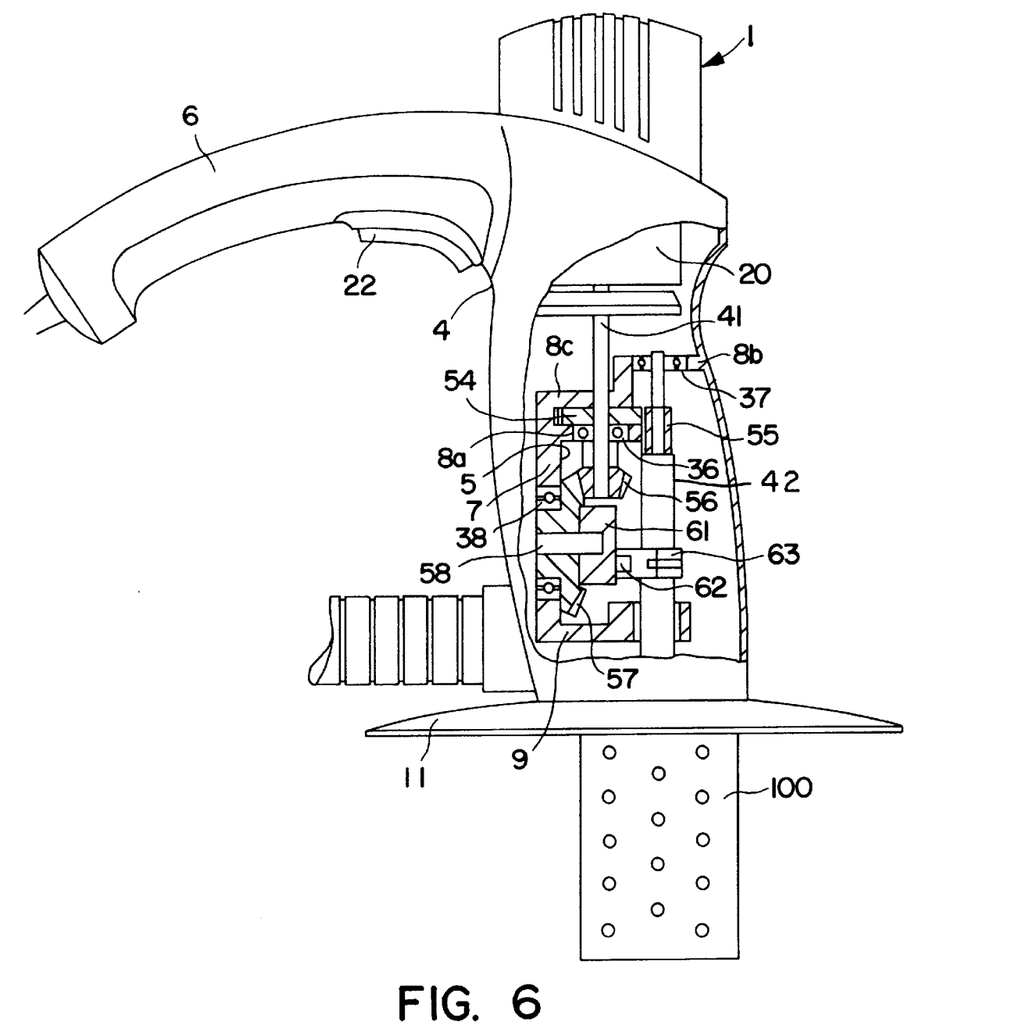
FIG. 6 is a side view, partially in cross-section, of a fourth embodiment of the machine tool of invention.

FIG. 6 shows a fourth embodiment of the machine tool of invention which is an embodiment with the outer outlines of an electric drill.

As in the preceeding embodiments, the casing 1 has two main hollows 4 and 5, which however are arranged along a vertical line. Whereas the partition walls 7 and 9 are similar to those of the preceeding embodiments, the partition wall 8 has at least two wall sections 8a, 8b and optionally 8c. The wall sections 8a, 8b, 8c are arranged parallel to one another and have openings for the passage of the input shaft 41 and the output shaft 42, respectively, or for accomodating bearings 36, 37. A gear 55 is wedged on shaft 41 and meshes with a gear 55 on the output shaft 42. Input shaft 41 carries a bevel gear 56 which meshes with a further bevel gear 57 which is fixed at an intermediate shaft 58 journalled in a bearing 38. Bevel gear 57 carries a disk 61 of the oscillating mechanism 60 which corresponds to that described with FIG. 1. Please note that the gear 55 has a length sufficient to take up the stroke length of the oscillating mechanism 60, that is, does not disengage from the gear 54 when reciprocating.

Figure 8:
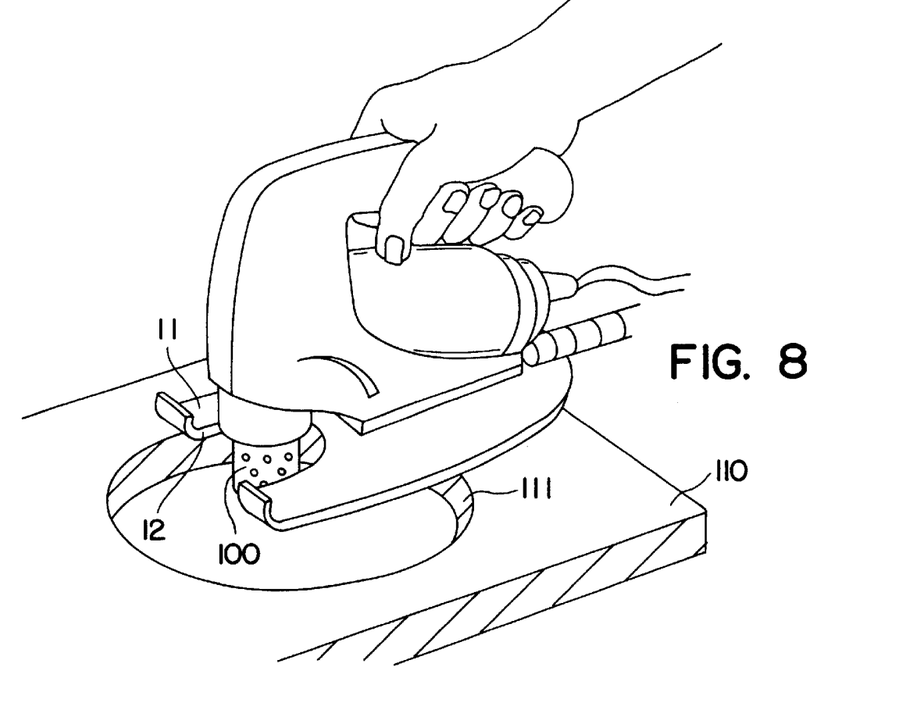
FIG. 8 is a perspective view of the machine tool in use.
Figure 9:
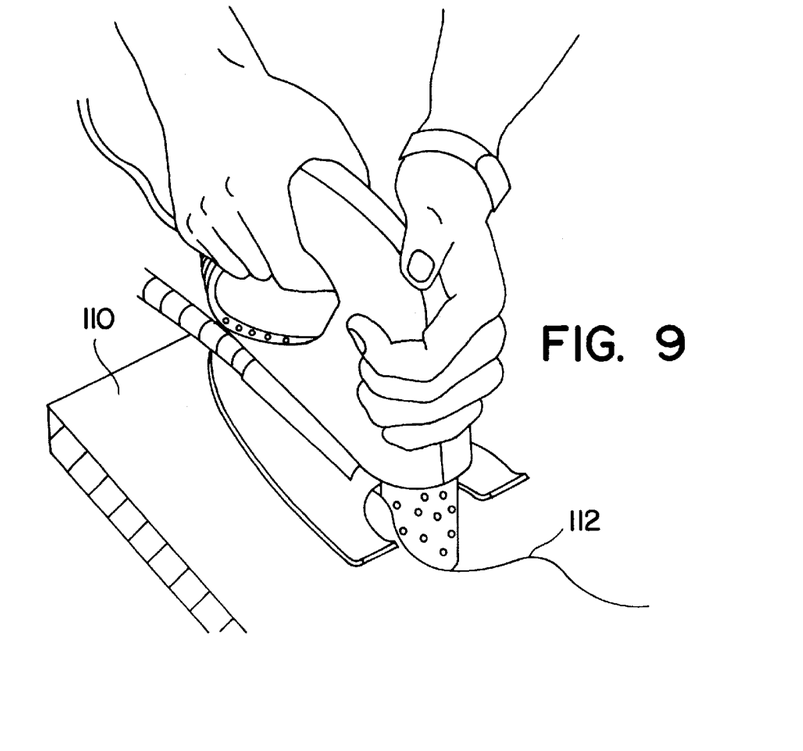
FIG. 9 is another perspective view of the machine tool in use.

FIGS. 8 and 9 show how to use the machine tool of invention. A workpiece 110 having a hole 111 cut in it by a jig saw can be flattened by the machine tool of invention. As shown, the skid plate 11 is moved on the surface of the workpiece 110 along the rim of the hole 111 so that the tool 100 sands the surface of the hole 111. The work can be done by one hand grasping the handle 6. It is to be noted that such handle 6 extends generally parallel to the skid plate 11 and also to the general extension of the casing 1 accomodating the motor, yet perpendicular to the axial extension of the tool 100. The machine tool may also be held by two hands, as shown in FIG. 9, if a rim or edge surface 112 is to be worked upon.

Figure 10:
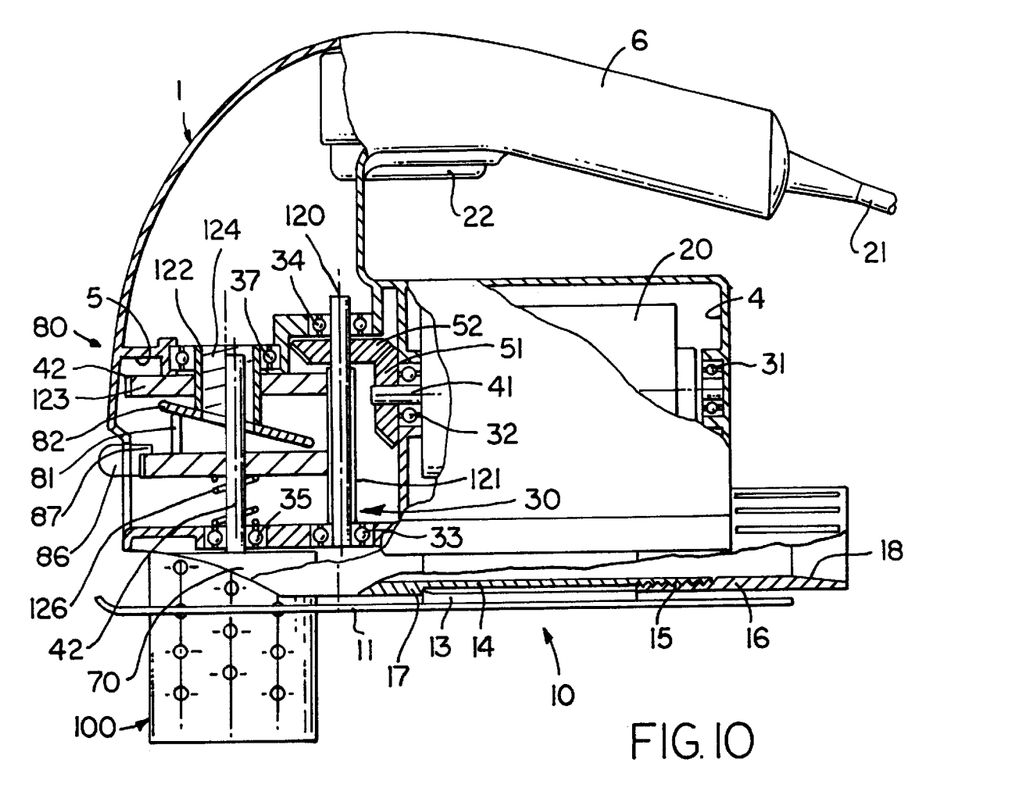
FIG. 10 is a schematic side view of a fifth embodiment, partly in cross section, of the machine tool of invention.

Referring to FIG. 10, a hand-held machine tool comprises a casing 1 having first and second hollows 4, 5 therein, an electric motor 20 enclosed in said first hollow 4 and a driving mechanism 30 enclosed in said second hollow 5. A handle 6 is connected to said casing 1. A guiding and supporting means 10 for moving the machine tool parallel to the guiding axis and along a workpiece is provided. The guiding and supporting means taking the form of a skid plate 11 has a recess 12 through which a tool 100 extends, having a working surface adapted for sanding, rasping or filing and being connected to the driven shaft 42 via a tool holder 70. The skid plate 11 having mounting means 13 is mounted on a tube 14. The front end 17 of the tube has a thicker wall thickness and is connected to the casing 1. The back end of the tube 14 has a thread 15 on which a hollow clamping means 16 is screwed. The larger wall thickness 17 at the front end of the tube 14 forms a shoulder against which the sleeve 13 is pressed when the clamping means 16 is screwed tightly. This enables adaptions to the angle of said skid plate 11. The clamping means 16 has a conical outlet 18 which can be connected to a vacuum source so as to suck any dust and debris from near said attached tool end 100.

An electric cable 21 is to be found in the handle, connecting to a switch 22 for energizing and deenergizing the electric motor 20.

The electric motor 20 has a driving shaft 41 which is held by the bearings 31 and 32 and in operation is driving a bevel gear 51 which is engaged in a further bevel gear 52. The bevel gear 52 is fixed to a toothed input shaft 120, the teeth 121 of which run parallel to the axis, and is held in position by the bearings 33 and 34 which in turn are held in place by the casing 1. An intermediate hollow shaft 122 is mounted in bearings 37 and has a gear 123 engaging with the toothed shaft 120. A journalling filling member 124 has an outer diameter for fitting into the hollow of the intermediate shaft 122, and an excentric bore registering to the output shaft 42 for supporting same near its upper end. The lower end is mounted in bearings 35. A wobble disk or swash plate 82 is attached at the lower end of the intermediate shaft 122 and interacts with a pin element 81 which is fixed to a driven gear 125. The gear 125 is in turn attached to the driven or output shaft 42. The filling member 124 and the bearing 35 allow the output shaft 42 to oscillate along its axis simultaneously supporting against lateral forces. A spring 126 urges the gear 125 in the direction of the swash plate 82, so as to hold the pin element 81 in engagement onto the swash plate 82.

As shown in FIG. 10, the shafts 120, 122 and 42 all run parallel to each other. There is a small axial disctance between the axis of shaft 122 to the axis of shaft 42. As a result, the transmission ratio between shafts 120 and 122 is slightly larger than the transmission ratio between the shafts 120 and 42. In other words, the gear 125 and consequently the pin element 81 rotate slightly quicker than the gear 123 and the swash plate 82. Due to the relative movement of the follower element 81 along a circumferential path on the swash plate 82 a reciprocal motion of the driven shaft 42 and the tool 100 results relative to the skid plate 11. The ratios are chosen so that one oscillation takes place in 30 rotations of the tool.

The arrangement of the swash plate 82 and the follower element 81 forms an oscillating arrangement 80 for the oscillating motion given to the driven shaft 42. This oscillation can be deactivated by a slide 86 having a forked end 87 which interacts with the gear 125. When the slide 86 is pushed downwards, it disengages the pin element 81 from the swash plate 82, thus deactivating the oscillating motion.

Figure 11:
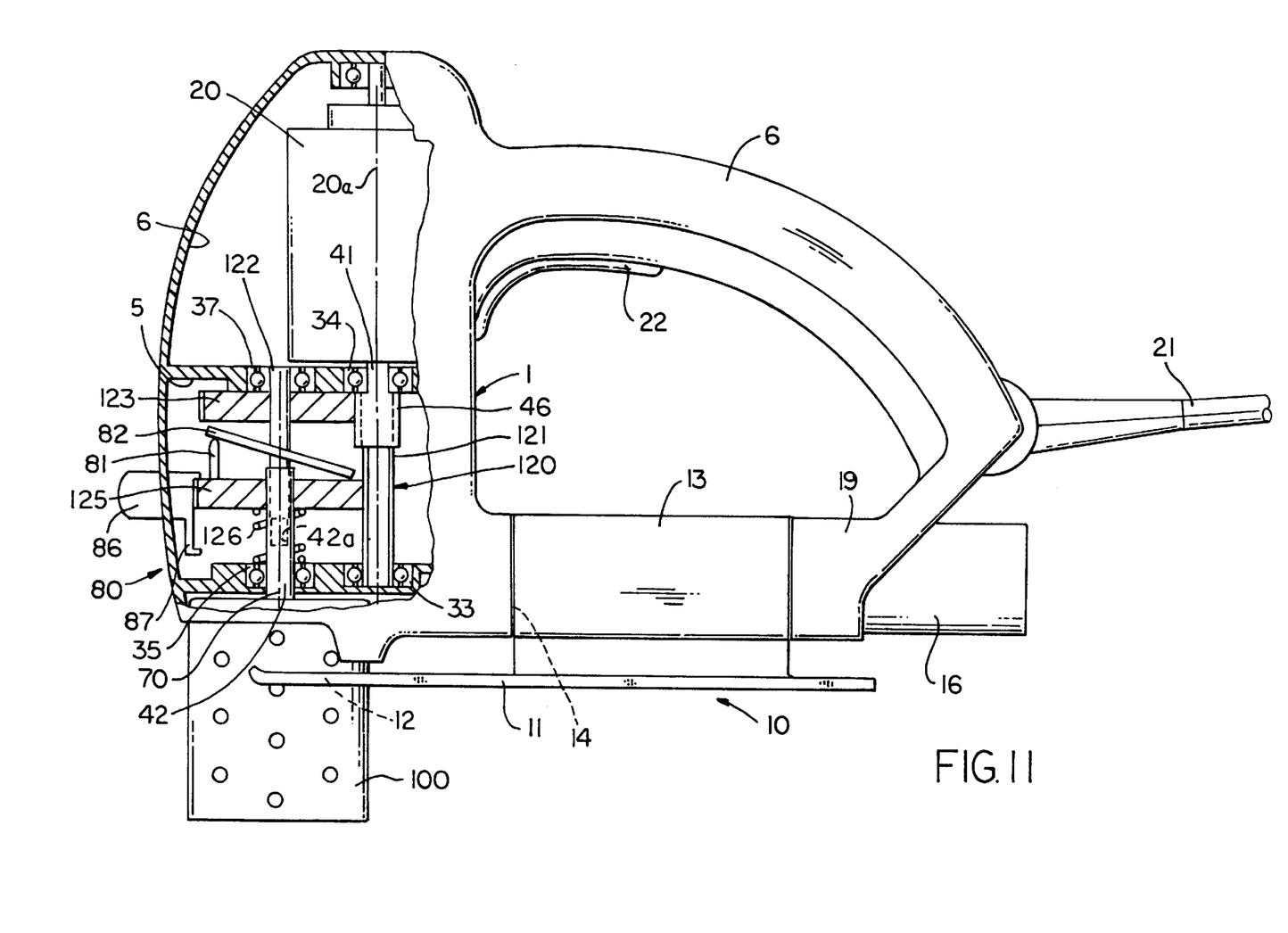
FIG. 11 is a schematic side view of a sixth embodiment, partly in cross section, of the machine tool of invention.

FIG. 11 shows another embodiment of the sanding, rasping and polishing device. Corresponding components already described maintain the same reference numbers. One difference to the FIG. 10 embodiment is that the motor 20, having an axis 20a, is vertical. This example shows that the toothed shaft 120 and the driving shaft 41 are coaxial and can form one input shaft 120.

The handle 6 has an extension 19 and forms a part of the guiding and supporting means 10. The skid plate mounting means in the form of a sleeve 13 is positioned between the casing 1 and the handle extension 19 and is mounted on the tube 14, as in example FIG. 10. The clamping means 16 clamps the skid plate attachment 13 in position, enabling the skid plate 11 to be set at different angles.

FIG. 11 also shows a variation of the oscillating arrangement 80 which could replace the FIG. 10 embodiment.

The main difference is that output shaft 42 is coaxial to intermediate shaft 122 and that the transmission ratios to the intermediate shaft 122 and output shaft 42, respectively, are made different by using different diameters of a gear 46 (fixed or integral with shaft 42) and of gear 121 on shaft 120. Output shaft 42 has a hollow 42a wherein the free end of the intermediate shaft 122 is slidably supported. Shafts 42 and 122 form a telescoping unit which is supported and journaled by bearings 35 and 37.

Since the diameters of the gears 46 and 121 are different, the diameters of the gears 123 and 125 as well as the rotational speed of the shafts 122 and 42 are also different. This has the effect that there is a slight rotational difference between the swash plate 82 and gear 125 so that an orbital movement of the pin 81 around the circumference of the swash plate 82 is created. This relative movement leads to the oscillating movement of the output shaft 42, i. e. one reciprocal movement upon a great number (say 30) of rotations of the output shaft.

Figure 12:
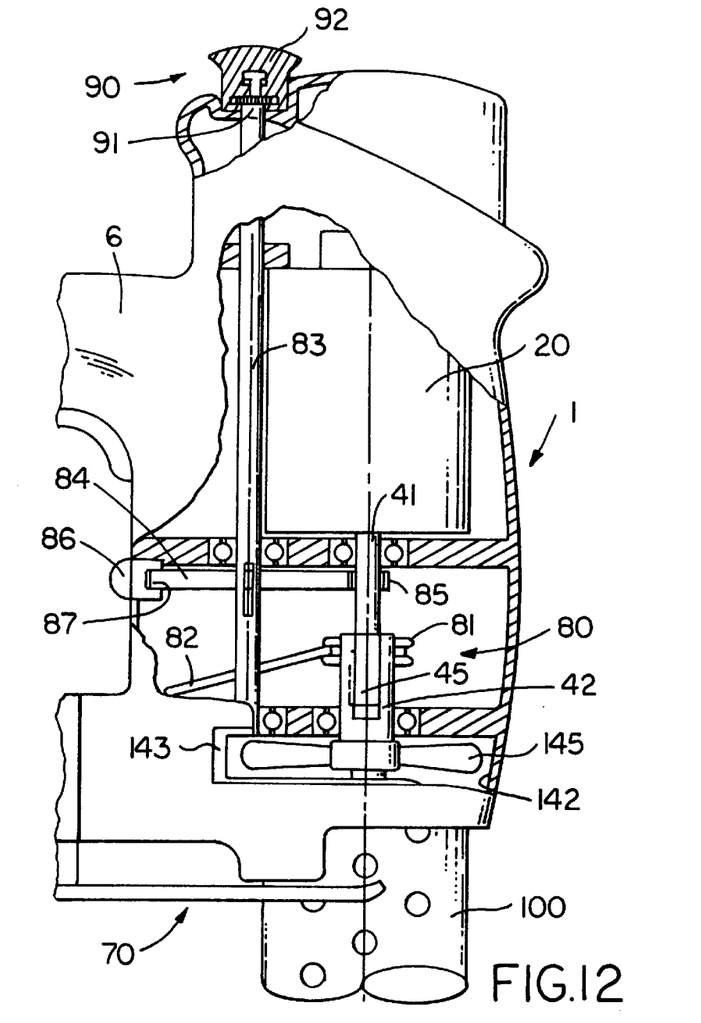
FIG. 12 is a schematic side view of a seventh embodiment, with parts broken away and partly in cross section, of the machine tool of invention.

FIG. 12 shows a further embodiment, however corresponding components already described maintain the same reference numbers. The assembly of the casing 1 and the motor 20 correspond to the assembly shown in FIG. 11. The design of the handle 6 with handle extension for the supporting means 10 corresponds to the embodiment shown in FIG. 11 and is therefore not shown in FIG. 12. The main difference is found in the construction of the oscillating arrangement 80 having a grooved roller as a follower element 81 for the wobble or swash plate 82.

The driving or input shaft 41 and the driven or output shaft 42 have the same axis, however, the driven shaft 42 is at least partly hollow, allowing the lower part of the driving shaft 41 to intervene. A coupling means 45 is arranged between input and output shafts 41 and 42 and transfers the rotational movement or torque from the motor 20 to the tool 100, however, still allowing a simultaneous oscillation motion, caused by the oscillating arrangement 80, to take place.

The oscillating arrangement 80 comprises the already mentioned components 81 and 82 as well as an intermediate shaft 83 and the gears 84 and 85. The gear 85 could be formed directly on the shaft 41. The gear 84 is a shift gear 84 and connected to the intermediate shaft 83 by a key so as to drive the same. The slide 86, having a forked end 87, and connecting to the gear 84 serves to bring the gears 84 and 83 in and out of engagement. The shaft 83 is no longer driven when the gears 84 and 83 are disengaged, this results in the oscillation being switched off.

The shaft 83 has an adjustment means 90, which can alter the height of the tool 100 relative to the guiding and supporting means 10. The adjustment means 90 comprises of a toothed disk 91 which is attached to the end of the shaft 83, and the knob 92 which sits loosely over the toothed disk 91. However, when the knob 92 is pressed, it couples with the toothed disk 91. This enables the shaft 83 to be turned by hand. The height adjustment should only be used when the shift gear 81 is disengaged from gear 83. By pressing and turning the knob 92 simultaneously, the shaft is rotated which subsequently turns the swash plate 82 which consequently moves the grooved roller or follower element 81 up or down. The position of the grooved roller 81 defines the height of the tool 100 relative to the guiding and supporting means 10, thus forming a tool stop.

To oscillate the tool 100, it is necessary to engage the shift gear 85 with the gear 84 and to turn the motor 20 on. The gears 84 and 85 drive the intermediate shaft 83, which consequently turns the swash plate 82. The edge of the swash plate wobbles and engages with the grooved roller 81 which assumes a reciprocal motion making it go up and down and simultaneously rotating due to the coupling arrangement 45 between the shafts 41 and 42.

The ratio between the oscillation and the rotational motion is defined by the gear ratio transmission between the gears 85 and 84. A favourable ratio lies between 1:10 and 1:30.

Additionally or alternatively to the vacuum arrangement for sucking the sanding dust through the tube 14 and through the hollow clamping means 16, it is possible to attach a dust bag 140 (FIG. 13) via an attachement ring 141, which collects the sanding dust.

Figure 13:
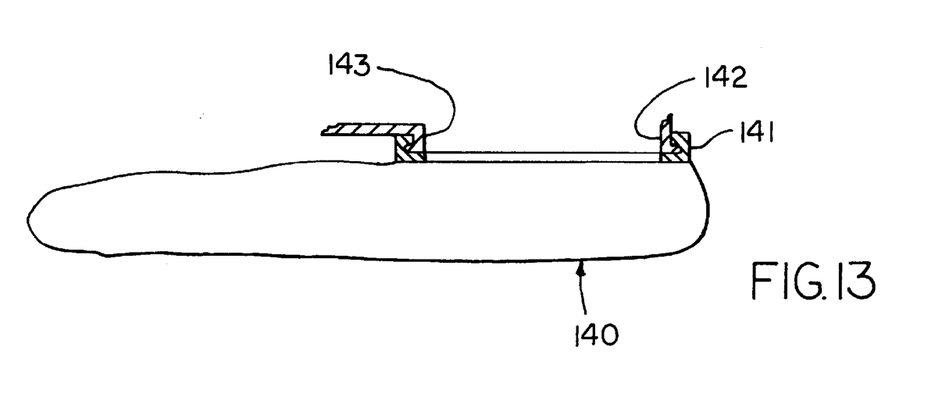
FIG. 13 is a dust collecting bag for use with the machine tool of invention.

The casing has an opening 142 which is surrounded by an attachment ring 143 which fits exactly with the attachment ring 141 on the dust bag 140. A ventilator 145 is mounted on the driven shaft 42, which sucks the dust produced by the tool 100 through the opening 145 into the dust bag 140.

Figure 14:
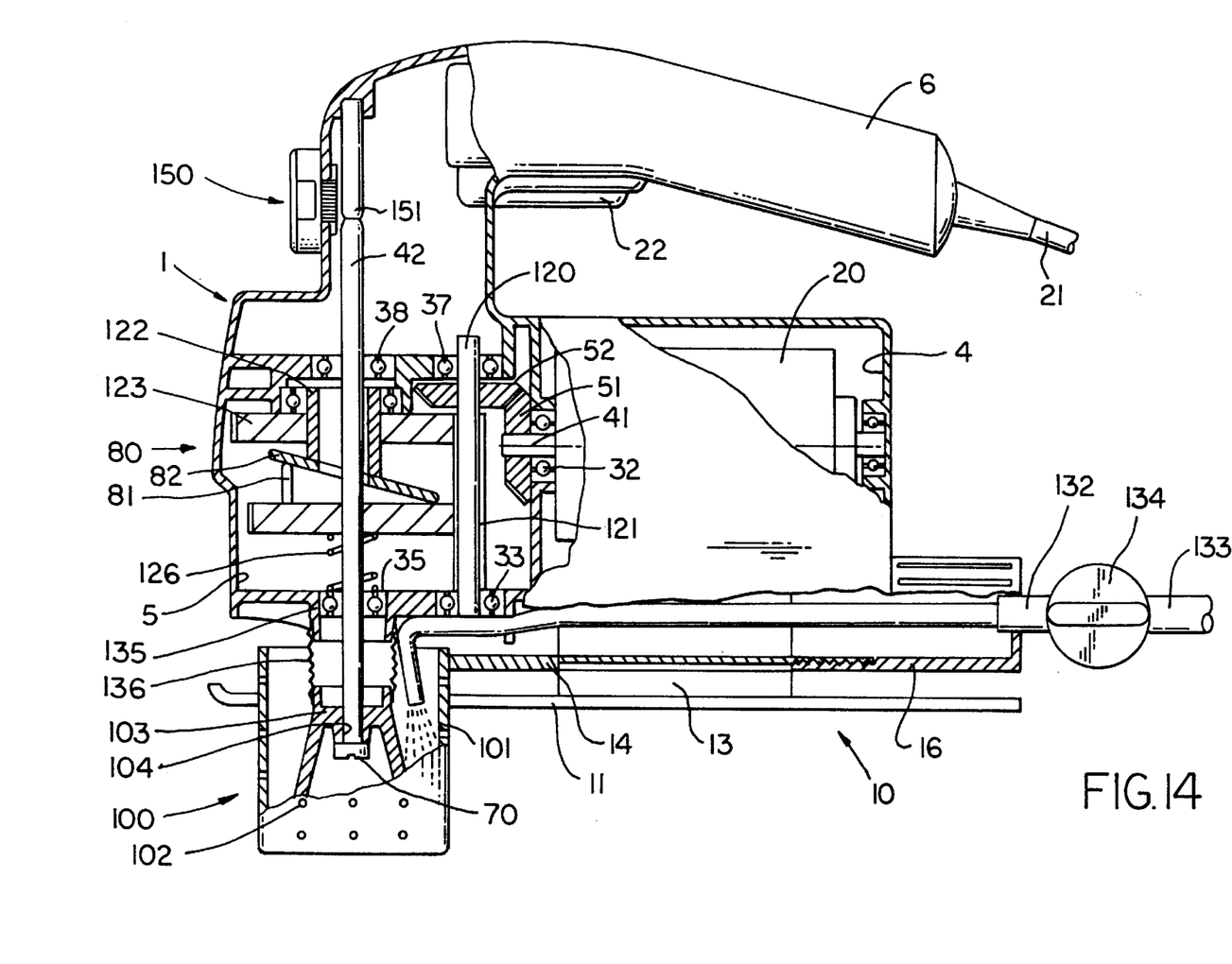
FIG. 14 is a schematic side view of an eight embodiment, with parts broken way and partly in cross section, of the machine tool of invention.
Figure 15:
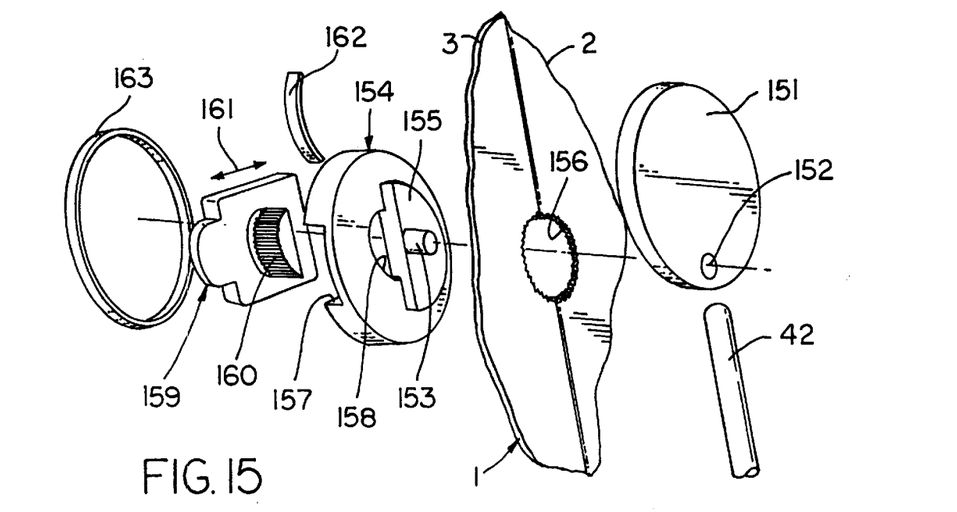
FIG. 15 is a perspective view of parts used in the eight embodiment.

FIGS. 14 and 15 show an embodiment which is particularly adapted for grinding stone. The allover design is similar to the FIG. 10 embodiment so that the same reference numbers are used for the same functional members. There are two additional features:

1. admitting water to the tool 100 and
2. adjusting the length which the tool 100 projects relative to the skid plate 11, here termed "depth adjustment" or "tool position adjusting means".

A water-admitting means 130 is provided and includes a tube 131 which is mounted within tube 14 and knob 16 and extends into the hollow interior of the tool 100. Preferably, the end of the inner tube 131 is curved downwardly, as shown. The outer end of tube 131 is connected to a coupling 132 for coupling to a hose 133 which includes a valve 134. The hose 133 is connected to a source of water, and the valve 134 allows to restrict waterflow as desired. The casing 1 has a collar 135 which holds a bellows 136 being formed with a lip seal at its lower end. The lip seal cooperates with the central hub 103 of the tool in order to prevent water from entering into the hollow 5 of the casing.

The water entering into the interior of the tool 100 is helpful for cooling same and for rinsing away any dust produced when grinding stone.

It is also possible to direct waterflow to the outside of tool wall 101 for cooling same. In this case, the tube 131 passes through an opening (not shown) in the wall of the outer tube 14.

A tool position adjustment device 150 is also provided which is also useful in applications with sanding tools. "Tool position" or "depth" means the distance between the lower radial side 106 of the tool to the underside of the skid plate 11. The depth adjustment device 150 functions on axially supporting the upper end of output shaft 42. As shown, this output shaft extends beyond upper bearing 38 of shaft 42.

One form of depth adjusting device 150 can include a screw bolt as a support means registering to the output shaft 42 and an aligned threaded bore of the casing. By screwing the bolt into the bore, the projecting length of the tool can be varied.

There are further possibilities for providing this function and one based on cam operation will be described in connection with FIGS. 14 and 15.

The depth adjustment device 150 of this embodiment includes a cam 151 in the form of an excenter having an excentric bore 152. Cam 151 is fixed to a shaft 153 belonging to a knob 154 having a retainer plate 155. The shell halves 2, 3 of the casing form a toothed opening 156 so that knob 154 can be catched by the rims of the opening 156 between main body of knob 154 and retainer plate 155. The knob 154 has a recess 157 which has an axial extension 158 in the form of a segment of a circle, a pusher member 159 having a toothed segment 160 fits into the recess 157 and segment 160 in the extension 158 some clearance in the direction of arrow 161. A leaf spring 162 urges pusher member 169 to the left in FIG. 15. A retainer ring or cover 163 keeps pusher member 159 in recess 157 in order not to get lost.

When the pusher member 159 is pushed inwardly (to the right side in FIG. 15) the toothed segment 160 gets out of engagement with the toothed opening 156 so that the knob 154 can be turned rotating the cam 151. If the pusher member 159 is released, the leaf spring 162 shifts toothed segment 160 into engagement with the toothed opening 156, thus latching the position of knob 154 and of cam 151.

The depth adjustment device 150 makes it possible to switch off the oscillating movement of the tool 100. By turning the knob 154 by an appropriate amount, the cam 151 will push the output shaft 52 downwardly by a distance sufficient to overcome the oscillations produced by the oscillating means 80 so that the follower element 81 gets out of contact to the wobbling swash plate 82. In this situation, the tool 100 simply rotates. By further turning knob 154, the depth, that is a distance between planes 11 and 106, can be adjusted. Whereas the depth adjustment device 150 has a limited range of depth adjustment, please consider the fact that the tool 100 can be replaced by another tool having a different length between tool holder 70 and tool underside 106. By providing a series of tools 100 having different lengths, a great range of depth can be covered.

The machine can be built in different variations, but still be within the protection of the claims. The swash plate or wobble plate 82 could also take the form of a bearing mounted on the shaft 83, and has an arm which protrudes to the follower element 81 so as to drive same into an oscillating motion.

A simpler version of the machine is possible by combining the handle 6 with the casing 1, in other words, the casing is also the handle.

What is claimed is:

1. A portable power tool for sanding, rasping, grinding or polishing comprising:

a housing, a motor in said housing and having a motor shaft, a driving mechanism connected to said motor shaft and including means for rotating an input shaft and an output shaft, and means for oscillating said output shaft;

said oscillating means including a wobbling swash plate which is mounted onto an intermediate shaft and cooperates with a follower element;

a tool holder attached to said output shaft for holding a tool for sanding, rasping, grinding or polishing a workpiece;

means for guiding and supporting said power tool along said workpiece;

said output shaft being mounted slideably in a direction parallel to said input shaft and having means carrying said follower element;

said wobbling swash plate and said follower element being arranged and constructed so that when there is relative rotation between said swash plate and said follower element, said follower element and said output shaft oscillate;

said input shaft and said output shaft having gears constructed to allow meshing with one another whilst said output shaft and said output shaft gear are oscillating.

2. The portable power tool set forth in claim 1 wherein said input shaft has teeth along a substantial portion of its length;

said follower element is attached to said output shaft gear which is driven by said input shaft teeth, and is urged against said swash plate by spring means;

said input shaft teeth mesh with a gear of said intermediate shaft so as to obtain a first slowing down gear transmission ratio;

said input shaft teeth also mesh with said output shaft gear so as to obtain a second slowing down gear transmission ratio wherein said first slowing down gear transmission ratio and said second slowing down gear transmission ratio differ slightly from one another so that said relative rotation between said swash plate and said follower element is a low rotational speed difference between said intermediate shaft and said output shaft and oscillation of the output shaft is slow in relation to rotation of the output shaft.

3. The portable power tool set forth in claim 2 wherein said intermediate shaft is hollow and said output shaft extends into said hollow of said intermediate shaft, further comprising a filler member journalled in said hollow of said intermediate shaft having an excentric bore in which said output shaft extends.

4. The portable power tool set forth in claim 2 wherein said intermediate shaft is hollow and said output shaft has an end extending through said hollow of said intermediate shaft, further comprising means for adjusting the position of said tool relative to said guiding and supporting means of said portable power tool, said tool position adjusting means including support means adjustably fixed to said casing of said portable power tool in a position so as to support said extending end of said output shaft.

5. The portable power tool set forth in claim 4 wherein said tool position adjusting means comprises
a cam acting on said support,
a toothed opening in said casing of said portable power tool,
a knob mounted in said toothed opening and having coupling means which normally engage said toothed opening so as to fix said knob against rotation, yet can be brought out of engagement so as to allow to rotate said knob, and
a shaft fixedly connected to said cam and said knob so that when said knob is fixed in said toothed opening of said casing, said cam is also fixed in its position, and when said knob is out of engagement with said toothed opening and is rotated, said cam is adjusted in rotional position.

6. The portable power tool set forth in claim 1, wherein said wobbling swash plate describes a path, further comprising switching means arranged for moving said follower element in or out of said path of said wobbling swash plate so as to switch said oscillating means on or off.

7. The portable power tool set forth in claim 6, wherein said follower element is attached to said output shaft gear, and wherein said switching means is arranged for shifting said output shaft gear in a first position where said follower element has contact with said swash plate, and in a second position where said follower element has no contact with said swash plate.

8. The portable power tool set forth in claim 1 wherein said intermediate shaft has its axis parallel to and slightly offset from the axis of said output shaft.

9. The portable power tool set forth in claim 1 wherein said intermediate shaft and said output shaft are arranged coaxially to one another, one of said output shaft and intermediate shaft having a hollow and the other of said intermediate shaft and output shaft have a free end, said free end being slidably received in said hollow.

10. The portable power tool set forth in claim 9 wherein said input shaft has first and second gears different in diameter, said first gear meshing with a third gear on said intermediate shaft and said second gear meshing with a fourth gear on said output shaft, said third and fourth gears also bing different in diameter.

11. The portable power tool set forth in claim 1 wherein said input shaft is an extension of said motor shaft.

12. The portable power tool set forth in claim 1 further comprising a pair of meshing bevel gears, one of the pair being connected to said motor shaft and the other of the pair to said input shaft.

13. The portable power tool set forth in claim 1 also including torque transfer means coupling said input shaft and said output shaft in a manner which allows a relative reciprocal movement of said output shaft to said input shaft;
said follower element being a grooved roller which is attached to said output shaft;
said wobbling swash plate having an edge which engages in the groove of said grooved roller so as to drive said grooved roller along with said output shaft in an oscillating motion.

14. The portable power tool set forth in claim 13 further comprising a meshing gear pair for driving said intermediate shaft from said input shaft, one of said gears being designed as a shift gear shiftable by a switching means so as to bring the gear pair in and out of engagement, whereby whilst engaged an oscillation movement is produced via the wobbling swash plate and the follower element, whereas no oscillation occurs when the gears of the pair do not engage as the intermediate shaft and subsequently the swash plate are not driven.

15. The portable power tool set forth in claim 14 further comprising an adjustment means for adjusting the position of the tool relative to said guiding and supporting means, said adjustment means allowing to turn said intermediate shaft manually whilst the oscillation is deactivated, thus turning said swash plate which interacts with said follower element thus adjusting same and the position of said output shaft.

16. The portable power tool set forth in claim 1 wherein said guiding and supporting means include mounting means for being attached to said casing, said mounting means having tube means extending in and along said guiding and supporting means, said tube means having an outer tube fixed to said casing, and
an inner tube extending in said outer tube and having an inner end and an outer end, said outer end being provided with coupling means for being coupled to a source of cooling fluid, and
said inner end being shaped for directing said cooling fluid through said inner tube to said tool.

17. The portable power tool set forth in claim 16 wherein said tool has an outer cylindrical wall with holes in it, an inner fixing member and a hollow extending between outer wall and inner fixing member, said inner end of said inner tube being directed to said hollow between outer wall and inner fixing member.

18. A hand-held machine tool for a workpiece comprising:
a casing having first and second hollows therein,
an electric motor enclosed in said first hollow and having a driving shaft,
a driving mechanism accommodated in said second hollow and being drivingly connected to said driving shaft,
said driving mechanism including a driven shaft and means for rotating and oscillating said driven shaft,
a tool holder on said driven shaft for holding a tool having a working surface adapted for sanding, rasping and or filing a workpiece,
a handle fixedly connected to said casing and including electric power conducting means and a switch for energizing and deenergizing said electric motor, and
a guiding and supporting means having mounting means for being attached to said casing,
said means for rotating said driven shaft comprising gear transmission means and said means for oscillating comprising a driving disk and a follower member and wherein interengaging means are provided such that when the disk rotates, the follower member reciprocates,
said interengaging means comprises a rotatable disk having an eccentric groove therein and said follower member having a pin engaging said groove and being rotatably fixed to said driven shaft such that when said disk rotates, said follower member reciprocates and carries along said driven shaft.

19. A hand-held machine tool for a workpiece comprising:
a casing having first and second hollows therein,
an electric motor enclosed in said first hollow and having a driving shaft, a driving mechanism accommodated in said second hollow and being drivingly connected to said driving shaft, said driving mechanism including a driven shaft and means for rotating and oscillating said driven shaft, a tool holder on said driven shaft for holding a tool having a working surface adapted for sanding, rasping and or filing a workpiece, a handle fixedly connected to said casing and including electric power conducting means and a switch for energizing and deenergizing said electric motor, and a guiding and supporting means having mounting means for being attached to said casing, said means for rotating said driven shaft comprising gear transmission means and said means for oscillating comprising a driving disk and a follower member and wherein interengaging means are provided such that when the disk rotates, the follower member reciprocates, said casing having two shell halves, at least one thereof comprising partition wall means including a first partition wall adjacent to said first hollow, and second and third partition walls arranged transversely to said first partition wall, said first partition wall having a first opening for accommodating a first bearing for said driving shaft and a second opening for accommodating a second bearing for an intermediate shaft, a driving gear of said gear transmission being fixed to said driving shaft and carrying said rotating disk, intermediate gears of said gear transmission being provided to drive said intermediate shaft which has an end carrying a first bevel gear, said driving gear and said intermediate gears meshing with one another, said second partition wall having a third opening for accommodating a third bearing, an intermediate hollow shaft having two ends, one thereof being journalled and supported by said third bearing and the other end thereof carrying a second bevel gear, said first and second bevel gears meshing with one another, said intermediate hollow shaft and said driven shaft also comprising rotational coupling means which allow axial reciprocating movement to said driven shaft within said hollow shaft.

20. A portable power tool comprising a housing, a motor in said housing and having a motor shaft, a handle on said housing and including control means for said motor, a driving mechanism in said housing and including an output shaft having a shaft axis, a generally cylindrical tool for sanding, rasping or filing a workpiece and having an end attachable to said output shaft, means for guiding and supporting said power tool on a workpiece surface defining a guiding direction and having a base plate with a recess through which said cylindrical tool extends, said driving mechanism being connected to said motor shaft so as to rotate said output shaft, and including means for oscillating said output shaft, said guiding and supporting means also including tubing means which extends parallel to said guiding direction near said attachable end of said tool and forms a pivotal seat, sleeve means which are fixed to said base plate and encompass said pivotal seat so as to allow pivotal movement of said sleeve means and said base plate about said guiding direction to select any pivotal position in a predetermined range from a neutral position of the base plate, and clamping means which are adapted to fix said sleeve means relative to said seat in any selected pivotal position of said sleeve and said base plate, said tubing means being also adapted to be connected to a vacuum source so as to suck any dust and debris from near said attachable tool end.

21. The portable power tool of claim 20 wherein said tool has an outer cylindrical wall encompassing a hollow and a central hub extending into said hollow and being adapted to be attached to said output shaft, said cylindrical wall also having radial holes adapted for suction openings when said portable power tool is connected to said vacuum source.

22. A hand-held machine tool comprising:

a casing (1) having first and second hollows (4,5) therein, an electric motor (20) enclosed in said first hollow (4) and having a driving shaft (41), a handle (6) fixedly connected to said casing (1) and including electric power conducting means (21) and a switch (22) for energizing and de-energizing said electric motor (20), said driving shaft (41) having a first rotational speed when said motor is energized, a driving mechanism (30) accommodated in said second hollow (5) and being drivingly connected to said driving shaft (41), said driving mechanism (30) including a driven shaft (42), means for rotating and means (60) for oscillating said driven shaft (42), said means for rotating said driven shaft (42) including a persistent, continuously engaging transmission means between said driving shaft and said driven shaft, which has a second rotational speed when said driving shaft rotates, said first rotational speed and said second rotational speed being similar, a tool holder (70) on said driven shaft (42) for holding a tool (100) having a working surface (101) adapted for sanding, rasping or filing a workpiece, and a guiding and supporting means(10) having mounting means (13,14) for being attached to said casing (1), wherein said continuously engaging transmission means comprises gear transmission means (40) and said means (60) for oscillating comprising a driving disk (61) and a follower member (63) and wherein interengaging means(62/64; 66/67) are provided such that when the disk (61) rotates the follower member (63) reciprocates, wherein said casing (1) has two shell halves (2,3), at least one thereof comprising partition wall means including a first partition wall (7) adjacent to said first hollow (4), and second and third partition walls (8,9) arranged transversely to said first partition wall, said first partition wall (7) having a first opening for accommodating a first bearing (32) for said driving shaft (41) and a second opening for accommodating a second bearing (33) for an intermediate shaft (43), a driving gear (46) of said gear transmission (40) being fixed to said driving shaft (41), first and second intermediate gears (50,47) of said gear transmission (40) being provided to drive said rotating disk (61) and said intermediate shaft (43) which has an end carrying a first bevel gear (48), said driving gear (46) meshing with said first intermediate gear (50) which is meshing with said second intermediate gear (47), said second partition wall (8) having a third opening for accommodating a third bearing (34), an intermediate hollow shaft (44) having two ends, one thereof being journalled and supported by said third bearing (34) and the other end thereof carrying a second bevel gear (49), said first and second bevel gears (48,49) meshing with one another, said intermediate hollow shaft (44) and said driven shaft (42) also comprising rotational coupling means (45) which allow axial reciprocating movement of said driven shaft (42) within said hollow shaft (44).

23. The hand-held machine tool set forth in claim 22, wherein said guiding and supporting means (10) defines a guiding axis for moving said machine tool parallel to said guiding axis and along a workpiece, and wherein said mounting means of said guiding and supporting means (10) includes a pivot joint (13,14) which allows pivoting said guiding and supporting means about said guiding axis, and fixing means (16,17) which allow fixing of said guiding and supporting means in selected pivoted positions relative to said guiding axis.

24. The hand-held machine tool set forth in claim 23 wherein said guiding and supporting means (10) is in the form of a skid plate (11) having a recess (12) through which said tool extends, said recess (12) having a width allowing said pivoting of said guiding and supporting means up to 45° from a horizontal, neutral position thereof.

25. The hand-held machine tool set forth in claim 23 wherein duct means (14) are provided having a first end with an opening arranged adjacent said tool holder (70) for attaching the tool (100) to said driven shaft (42), and a second end connectable to a vacuum source, said duct means forming a member of said pivot joint.

26. The hand-held machine tool set forth in claim 22 wherein said interengaging means includes a crank pin (62) and said follower member (63) has a guiding groove (64) for said crank pin which, when orbiting, slides along said guiding groove and reciprocates said follower member which is rotatably fixed to said driven shaft (42).

27. The hand-held machine tool set forth in claim 22 wherein said interengaging means comprises a rotatable disk (61) having an eccentric groove (66) therein and said follower member (63) having a pin (67) engaging said groove and being rotatably fixed to said driven shaft (42) such that when said disk rotates, said follower member reciprocates and carries along said driven shaft.

28. The hand-held machine tool set forth in claim 22 wherein said tool (100) is hollow and comprises a cylindrical wall having an outer surface (101) which is provided for sanding, rasping or filing, and a central hub portion (103) adapted to be coupled to said driven shaft (42), said central hub portion (103) being fixed to said cylindrical wall.

29. The hand-held machine tool set forth in claim 28 wherein said cylindrical wall has a plurality of holes (104).

30. The hand-held machine tool set forth in claim 22 also comprising accumulator means (25) which are enclosed in an accumulator housing, said accumulator housing and said casing comprising connector means (26) so as to connect and disconnect said accumulator means to and from said machine tool.

31. The hand-held machine tool set forth in claim 22 wherein said means for rotating is constructed to make a number of between 5 to 12 revolutions in a given time period, whereas said means for oscillating is constructed to make one reciprocating movement in said given time period.

32. The hand-held machine tool set forth in claim 31 wherein the ratio of revolutions to the reciprocating movement is between 7 to 10.

33. The hand-held machine tool set forth in claim 22 wherein said motor is adapted to make 1500 to 2000 revolutions per minute.

\* \* \* \* \*